(12) United States Patent
Simandl et al.

(10) Patent No.: US 7,896,053 B2
(45) Date of Patent: Mar. 1, 2011

(54) NON-DESTRUCTIVE COMPONENT SEPARATION USING INFRARED RADIANT ENERGY

(75) Inventors: Ronald F. Simandl, Knoxville, TN (US); Steven W. Russell, Knoxville, TN (US); Jerrid S. Holt, Knoxville, TN (US); John D. Brown, Harriman, TN (US)

(73) Assignee: Babcock & Wilcox Services Y-12, LLC, Oak Ridge, TN (US)

( * ) Notice: Subject to any disclaimer, the term of this patent is extended or adjusted under 35 U.S.C. 154(b) by 644 days.

(21) Appl. No.: 11/862,458

(22) Filed: Sep. 27, 2007

(65) Prior Publication Data

US 2009/0084983 A1    Apr. 2, 2009

(51) Int. Cl.
*B32B 38/10*    (2006.01)
(52) U.S. Cl. .................. 156/584; 156/344; 29/426.4
(58) Field of Classification Search ............... 156/344, 156/584; 29/403.4, 426.4
See application file for complete search history.

(56) References Cited

U.S. PATENT DOCUMENTS

| | | | |
|---|---|---|---|
| 4,888,302 A * | 12/1989 | Ramesh | ......... 117/44 |
| 5,620,794 A | 4/1997 | Burkart et al. | |
| 5,895,589 A | 4/1999 | Rogers et al. | |
| 6,355,203 B1 | 3/2002 | Charmes et al. | |
| 6,802,907 B2 | 10/2004 | Lewis, III et al. | |
| 2002/0179835 A1* | 12/2002 | Feygin | ......... 250/332 |
| 2003/0183168 A1* | 10/2003 | Kusuda et al. | ......... 118/641 |
| 2004/0016725 A1 | 1/2004 | Glauser et al. | |
| 2004/0052511 A1* | 3/2004 | Ducret et al. | ......... 392/416 |
| 2006/0219350 A1 | 10/2006 | Bain et al. | |

FOREIGN PATENT DOCUMENTS

| | | |
|---|---|---|
| DE | 100 56 322 | 1/2003 |
| DE | 101 37 713 | 3/2003 |
| EP | 0 979 710 | 2/2000 |
| GB | 1 292 174 | 10/1972 |
| JP | 405087452 A * | 4/1993 |
| WO | WO 96/17737 | 6/1996 |

* cited by examiner

*Primary Examiner*—Mark A Osele
(74) *Attorney, Agent, or Firm*—Michael J. Renner; Luedeka, Neely & Graham PC

(57) ABSTRACT

A method for separating a first component and a second component from one another at an adhesive bond interface between the first component and second component. Typically the method involves irradiating the first component with infrared radiation from a source that radiates substantially only short wavelengths until the adhesive bond is destabilized, and then separating the first component and the second component from one another. In some embodiments an assembly of components to be debonded is placed inside an enclosure and the assembly is illuminated from an IR source that is external to the enclosure. In some embodiments an assembly of components to be debonded is simultaneously irradiated by a multi-planar array of IR sources. Often the IR radiation is unidirectional. In some embodiments the IR radiation is narrow-band short wavelength infrared radiation.

3 Claims, 2 Drawing Sheets

NON-DESTRUCTIVE COMPONENT SEPARATION USING INFRARED RADIANT ENERGY

GOVERNMENT RIGHTS

The U.S. Government has rights to this invention pursuant to contract number DE-AC05-00OR22800 between the U.S. Department of Energy and BWXT Y-12, L.L.C.

FIELD

This disclosure relates to the field of debonding materials. More particularly, this disclosure relates to debonding methods using infrared radiant energy.

BACKGROUND

There are many situations in which one or more components of an assembled article are bonded together with adhesives, and there is a need to separate them. For example an assembly of adhesively-bonded components may contain a defective component and the other good components may be salvaged for re-use by separating them from the defective component. Various techniques have been developed and tried for separating such components. For instance, sometimes solvents are used to soften and/or dissolve the adhesive bonds. However, some of these solvents include hazardous chemicals that may physically harm persons using them to separate the components. Some of the solvents include oily ingredients and if they are used undesirable oily residues may remain on the components. Various dry debonding techniques have been developed to avoid these and other adverse effects of using solvents to separate adhesively-bonded components. For example, sometimes components may be separated by mechanical force. However oftentimes such force results in damage to one or more of the good components being salvaged. To overcome that risk, sometimes bonded parts are heated in a conventional or microwave oven because heat weakens the bonds of some adhesives. However, a problem with such heating is that oftentimes the bonded material must be heated to temperatures greater than 250° C. in order to soften the adhesive enough to permit separation of the components. When heated to such temperatures mismatches in the coefficients of thermal expansion between the components may induce thermo-mechanical stresses that may be sufficient to break one or more of the components. Also, the length of time required for debonding using a conventional oven or a microwave oven is often excessive, which may have adverse economic consequences. Furthermore, debonding in ovens often requires complex and expensive fixturing to separate the components after the adhesive bond is weakened by heat. What are needed therefore are improved devices and methods for separating components of an assembled article that are adhesively bonded to one another.

SUMMARY

The present disclosure provides a method for separating a first component and a second component from one another at an adhesive bond interface between the first component and second component. The method includes a step of irradiating the first component with infrared radiation from a source that radiates substantially only short wavelengths until the adhesive bond interface is destabilized and a further step of separating the first component and second component from one another.

A further embodiment provides a method for separating a first component and a second component from one another at an adhesive bond interface between the first component and second component, where the method includes a step of disposing the first component and the second component in an enclosure that is at least partially transparent to infrared radiation. The method proceeds with irradiating the first component with infrared radiation from a source that radiates substantially only short wavelengths, at least in part from an infrared radiation source that is external to the enclosure, until the adhesive bond is destabilized. The method further includes a step of separating the first component and the second component from one another.

Also provided is a method for separating a first component and a second component from one another at an adhesive bond interface between the first component and second component where the method includes a step of simultaneously irradiating the first component with infrared radiation from two or more multi-planar infrared sources until the adhesive bond is destabilized, and a step of separating the first component and the second component from one another.

A further method for separating a first component and a second component from one another at an adhesive bond interface between the first component and second component is provided, where the method includes a step of irradiating the first component with infrared radiation from a source that radiates substantially only short wavelengths, while maintaining the temperature of the second component at a temperature that is at least approximately 40° C. cooler than the temperature of the first component until the adhesive bond interface is destabilized. The method also includes a step of separating the first component and second component from one another.

An apparatus for separating a first component and a second component from one another is provided, where the apparatus includes an enclosure configured to contain the first component and the second component, where the enclosure is at least partially transparent to short wavelength infrared radiation. An infrared radiation source is provided external to the enclosure where the infrared radiation source emits substantially only short wavelengths, wherein the infrared radiation source and the enclosure are configured to expose at least one of the first and the second component to short wavelength infrared radiation until the first component and the second component are separated from one another.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
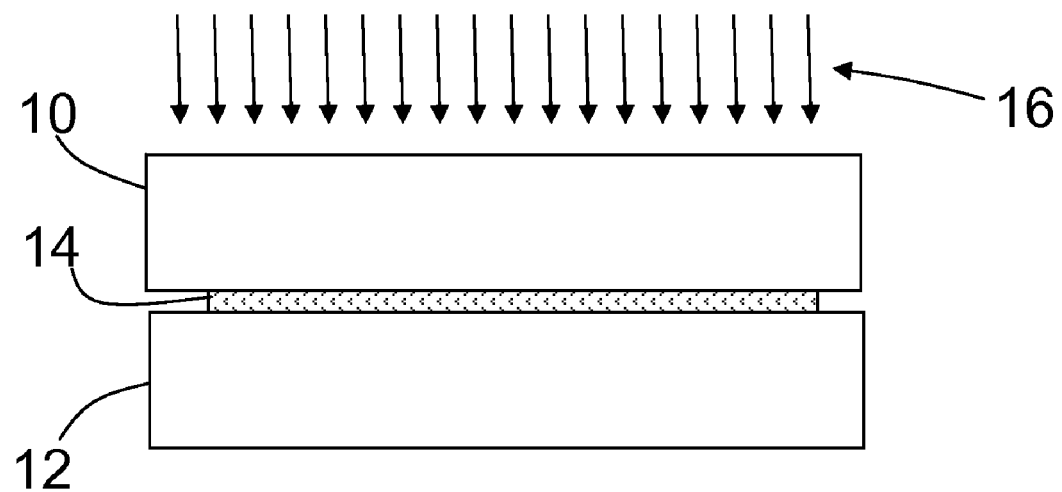
FIG. 1 is a somewhat schematic side view of two articles bonded with an adhesive, showing the application of unidirectional infrared radiation to one of the articles.

In the following detailed description of the preferred embodiments, reference is made to the accompanying drawings, which form a part hereof, and within which are shown by way of illustration the practice of specific embodiments of methods for separating two articles joined to one another with an adhesive bond. It is to be understood that other embodiments may be utilized, and that structural changes may be made and processes may vary in other embodiments.

Described herein are various embodiments of methods and devices for debonding assemblies of one or more component articles, where the component articles are joined together with adhesives. The component articles may be made from virtually any material, including metals, ceramics, organics, or polymers, or combinations thereof. In some embodiments the adhesive may be an organic adhesive. In some embodiments the adhesive may be an adhesive including but not limited to an adhesive comprising a urethane or an epoxy or an acrylic or an acrylate. In some embodiments the adhesives may comprise a urethane. In some embodiments the adhesive may comprise an epoxy. In some embodiments the adhesive may comprise an acrylic. In some embodiments the adhesive may comprise an acrylate including cyanoacrylates. In some embodiments the adhesive may comprise polyvinyl acetate glues (wood glues). In some embodiments the adhesive may comprise styrene/butadiene adhesives. In some embodiments the adhesive may comprise silicone adhesives. In some embodiments the adhesives may comprise contact adhesives, which typically include neoprene dissolved in methyl ethyl ketone, naphtha, and toluene.

The debonding process typically involves the application of infrared (IR) radiation and in particular short wavelength infrared radiation to at least one of the component articles. As used herein, the terms "short wavelength infrared radiation" and "infrared radiation of substantially short wavelengths" refer to infrared radiation having wavelengths in the range of approximately 0.1 microns to approximately 4 microns. "Medium bandwidth" short wavelength infrared radiation is defined herein as infrared radiation having wavelengths between approximately 0.2 and 3 microns. "Narrow bandwidth" short wavelength infrared radiation is defined herein as infrared radiation having wavelengths between approximately 0.7 and 1.3 microns. Typically the infrared radiation is "unfocused" which means that rays of infrared energy arrive at a component article without convergence of the rays through a lens or from a reflector after the rays leave the infrared source.

Infrared radiant energy is typically applied to at least one of an assembly of component articles until at least a portion of the bond joining the component articles is "destabilized" to a point where at least one of the component articles may be separated from the other(s). As used herein the term "destabilized" refers to a condition where the adhesive is sufficiently softened, melted, disintegrated, pyrolized or vaporized to a point where the articles either fall apart or may be separated using the equivalent of manually-applied forces with simple mechanical leveraging and without any significant mechanical shock forces that would be exerted by, for example, hammering or chiseling. Assemblies of component articles that are debonded in this manner may have adhesive residue left on one or more of the separated component articles, but such assemblies are still considered to be debonded.

Many of the embodiments presented herein utilize the application of unidirectional infrared radiant heating to one or more of the bonded component articles. As used herein, the term "unidirectional" refers to radiation that is emitted from a single point source (e.g., an infrared light emitting diode), a single line source (e.g., a quartz tube), or a planar source (e.g., an array of quartz tubes configured in a common geometric plane). For purposes of characterization herein, point sources are sources of energy having a diameter of less than a few millimeters. Consequently, ordinary heat lamps and heat guns that might in a different context be considered to be point sources are considered herein to be either line sources or planar sources, depending on the geometry of their filaments. Heat lamps or heat guns with a single substantially linear filament are line sources, whereas heat lamps or heat guns with arrays of filaments are planar sources.

Often the debonding is very rapid, taking minutes instead of the hours that are typically required using conventional means. In addition to time savings, unidirectional infrared radiant heating systems may be configured to heat only one component article at a time, thereby substantially reducing component breakage due to mismatches in coefficients of thermal expansion among the component articles. The likelihood of breakage of component articles may be reduced by instrumenting one or more of the component articles with one or more thermocouples, thus enabling the careful monitoring and control of temperature during the debonding operation. In some embodiments it is desirable to irradiate a first component with infrared radiation while maintaining the temperature of the second component at a temperature that is at least approximately 40° C. cooler than the temperature of the first component until the adhesive bond interface between the two components is destabilized. In such embodiments the temperature of the second component may naturally remain at least approximately 40° C. cooler than the temperature of the second component because unidirectional heating limits the heating of the second component by conduction through the adhesive bond line between the two components. In some embodiments the temperature of the second component may be maintained at least approximately 40° C. cooler than the temperature of the second component by cooling the second component.

FIG. 1 illustrates a side view of two component articles 10 and 12 that are bonded by a urethane adhesive 14. The application of unidirectional infrared radiant energy 16 heats component article 10. Heat is conducted from the component 10 to the urethane adhesive 14, which is the only contact area between the two component articles. The heat softens the urethane adhesive 14 and the component article 12 separates from the component article 10 before the component article 12 is heated significantly. The heating may be performed in an open environment where the temperatures of component articles 10 and 12 may be easily monitored using thermocouples or pyrometers. Such monitoring is more difficult when heating the component articles in an oven, particularly in a microwave oven where the microwaves often interfere with instrumentation.

In many embodiments disclosed herein a bonded assembly is irradiated with infrared radiation from a source that radiates substantially only short wavelengths. An example of such a source is a "T3 Quartz Lamp" that is rated at 3,000-4,000° F. Such a lamp typically produces 94 to 97% of its radiation as short wavelength infrared radiation. As used herein, a source is considered to radiate substantially only short wavelength infrared if at least 90% of the wavelengths of radiant energy produced are between 0.1 and 4 microns. Similarly, a source is considered to radiate substantially only medium bandwidth short wavelength infrared if at least 90% of the wavelengths of radiant energy produced are between 0.2 and 3 microns, and a source is considered to radiate substantially only narrow bandwidth short wavelength infrared if at least 90% of the wavelengths of radiant energy produced are between 0.7 and 1.3 microns. It is important to realize that at the same time that a bonded assembly is exposed to infrared radiation from a source that radiates substantially only short wavelengths, the assembly may also be exposed to infrared radiation from other sources of infrared radiation that do not radiate substantially only short wavelengths. For example, any assembly will typically be exposed to natural black body radiation from nearby fixtures and the assembly may also be exposed to infrared radiation generated by other (non-short-wavelength) nearby heating appliances.

Figure 2:
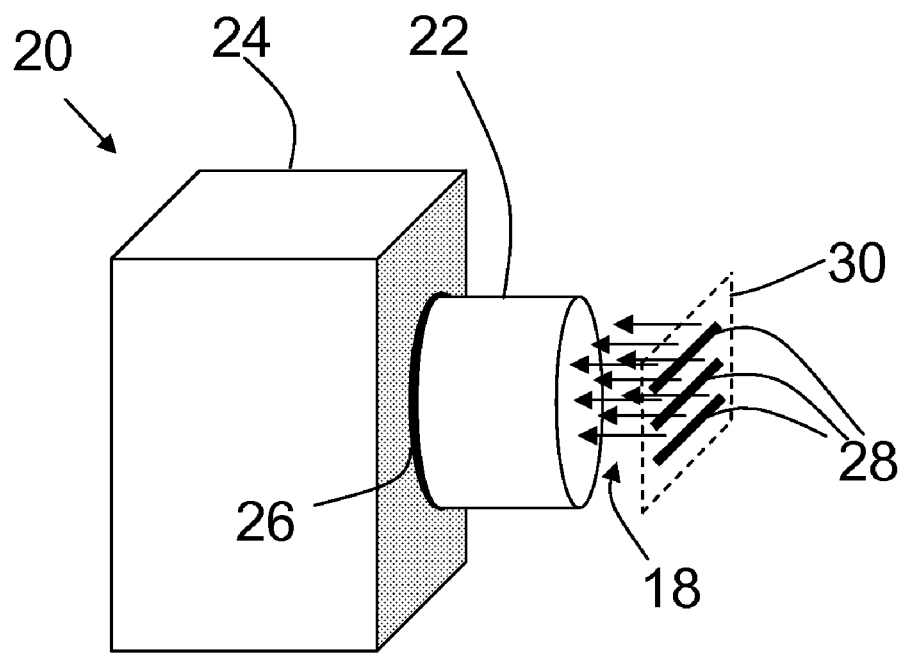
FIG. 2 is a somewhat schematic perspective view of two articles bonded with an adhesive, showing the application of unidirectional infrared radiation to one of the articles.

FIG. 2 illustrates a perspective view of an assembly 20 of components. A first component 22 is bonded to a second component 24 with an adhesive 26. The adhesive 26 is typically a urethane adhesive or an epoxy adhesive. An array of three quartz tubes 28 are configured in a geometric plane 30. This array of three infrared heat lamps 28 emits infrared radiation 18 that is at least in part unidirectional and is substantially the same as the unidirectional radiant energy 16 previously described with respect to FIG. 1. The infrared radiation 18 irradiates the first component 22 until the adhesive bond 26 is destabilized, and then the first component 22 may be separated from the second component 24. While the embodiment of FIG. 2 employs three quartz tubes 28, other embodiments may employ more or fewer quartz tubes.

Figure 3:
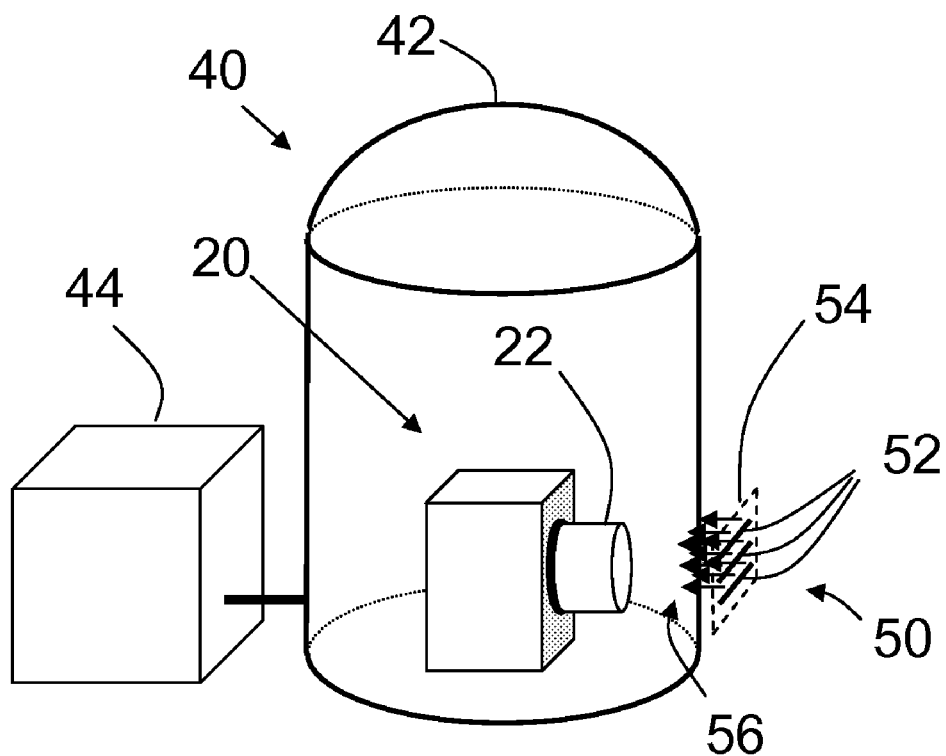
FIG. 3 is a somewhat schematic perspective view of two bonded articles in a bell jar, showing the application of unidirectional infrared radiation to one of the articles through a wall of the bell jar.

FIG. 3 illustrates an apparatus 40 for separating an assembly of components. The apparatus 40 has a quartz bell jar 42 and a combustion control device 44. The bell jar 42 is an example of an enclosure that may be used to contain at least a portion of an assembly that is to be debonded. The combustion control device 44 is provided to prevent fires or explosions within the bell jar 42 as assemblies are debonded. The combustion control device 44 may, for example, be a vacuum pump that is configured to withdraw combustible gas mixtures from the bell jar 42, or the combustion control device 44 may be an inert gas supply that flows inert gas into the bell jar 42. The embodiment of FIG. 3 employs an infrared heat source 50 that includes three lamps 52 configured in a geometric plane 54. Note that the heat source 50 is positioned outside the container (the bell jar 42, in this case) in which the assembly 20 of components is disposed for debonding.

The configuration of the three lamps 52 in the geometric plane 54 produces an infrared beam 56 that unidirectionally irradiates component 22 of the assembly 20 that is disposed within the bell jar 42. The quartz bell jar 42 has a transmission bandwidth for infrared radiation that is between approximately 0.2 and 4 microns in wavelength. Consequently, even if the infrared heat source 50 produces infrared radiation that are shorter or (more likely) longer than the short wavelength limits, the apparatus 40 of FIG. 3 still provides unidirectional infrared radiation from a source that radiates substantially only short wavelengths to irradiate the component 22 inside the bell jar 42. That is, the infrared heat source 50 and the portion of the wall of the bell jar 42 that filters the infrared radiation from the infrared heat source 50 (in a manner that passes only short wavelengths) cooperate in this embodiment to form an infrared source that radiates substantially only short wavelengths. While the embodiment of FIG. 3 employs three lamps 52, other embodiments may employ more or fewer lamps.

Figure 4:
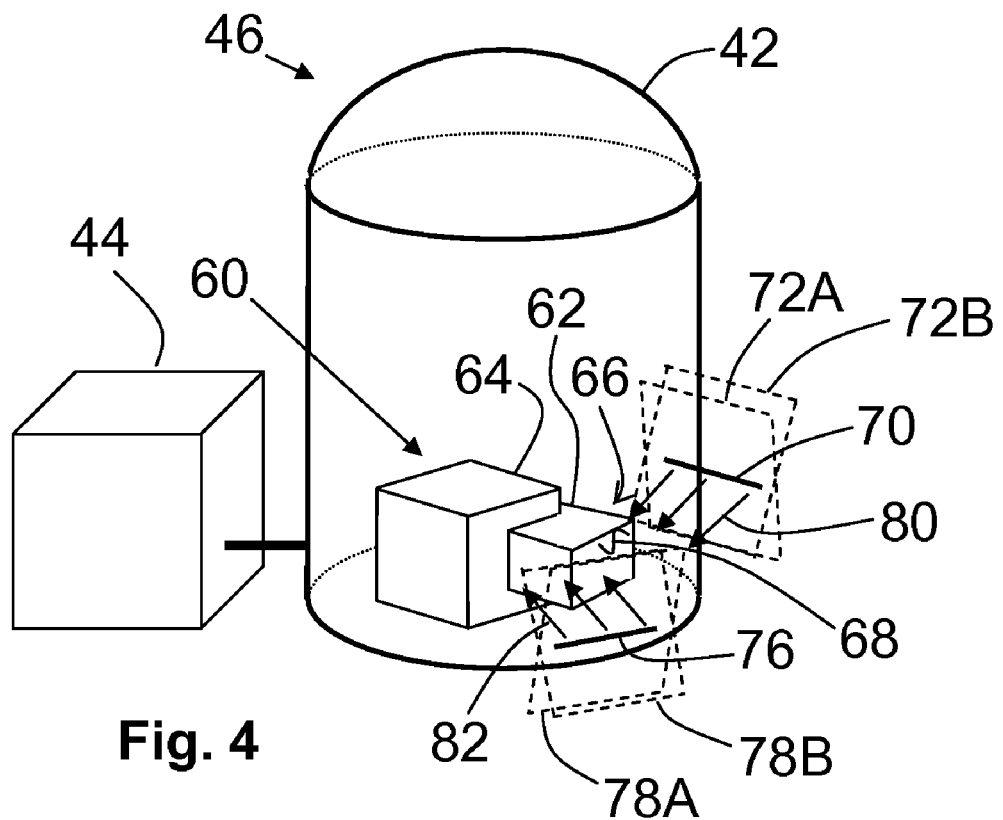
FIG. 4 is a somewhat schematic perspective view of two bonded articles in a bell jar, showing the application of multi-planar infrared radiation to one of the articles through a wall of the bell jar.

FIG. 4 illustrates an apparatus 46 for separating assemblies of components. The apparatus 46 employs the quartz bell jar 42 and the combustion control device 44 of the embodiment of FIG. 3. An assembly 60 of components is disposed in the quartz bell jar 42 of FIG. 4. The assembly 60 includes a first component 62 that is bonded to a second component 64. The apparatus 46 has a first infrared radiant energy line source 70 and a second infrared radiant energy line source 76. The first infrared radiant energy line source 70 lies in a plurality of geometric planes of which two geometric planes (72A and 72B) are depicted. The second infrared radiant energy line source 76 lies in a plurality of geometric planes of which two geometric planes (78A and 78B) are depicted. None of the geometric planes (e.g., 72A, 72B) of the first infrared radiant energy line source 70 are co-planar with any of the geometric planes (e.g., 78A, 78B) of the second infrared radiant energy line source 76. These two non-co-planar infrared sources are referred to herein as "multi-planar infrared sources." Multi-planar infrared sources may include more than two non-co-planar infrared sources. Also, it is to be noted that two or more point sources of infrared radiation are considered herein to be multi-planar energy sources even though any two point sources lie on a plurality of common geometric planes that pass through the two points.

For certain component debonding operations, such as the debonding of the assembly 60 in FIG. 4 where the adhesive bond line does not lay on a single geometric plane, multi-planar infrared sources provide an advantage because substantially the entire expanse of such an adhesive bond may be heated simultaneously. That is, the first infrared radiant energy line source 70 illuminates a first face 66 of the first component 62 and the second infrared radiant energy line source 76 illuminates a second face 68 of the first component 62. This multiple exposure arrangement prevents "shadows" and facilitates debonding of the first component 62 from the second component 64.

The following examples summarizing test specimens that were debonded using embodiments described herein are provided to illustrate some of the capabilities of these techniques.

Example 1

Three stainless steel butt-tensile specimens each measuring 2.9 cm diameter×3.8 cm long and weighing 180 g were bonded to one face of a 5.95 mm-thick cast iron plate. The adhesive used in this case was Halthane 88 with 21 phr Asilamine curing agent. Another three steel butt-tensile specimens were bonded to the same plate using Uniroyal Adiprene LW520 urethane cured with 14 phr of a methylenedianiline curing agent, XU205. All bond lines were set at 0.005" (127 μm). The urethane adhesive was cured in an oven at 90° C. The plate was then oriented with the steel butt-tensile specimens hanging downward. IR radiation was applied from the top of the plate with the IR lamp array at a distance of ~10" above the plate. The wave length of the IR radiation used in this experiment was near 1 μm. During this initial learning run the plate was heated to 250° C. for 15 minutes when all of the butt-tensile specimens released. The temperature of the steel specimens never exceeded 200° C. In all six cases the urethane released from the plate and remained attached to the steel butt-tensile specimens. In no case did the urethane appear to be badly degraded.

Example 2

Three stainless steel butt-tensile specimens each measuring 2.9 cm diameter×3.8 cm long and weighing 180 g were bonded to one face of a 3.46 mm-thick black stamped steel plate. The adhesive used in this case was Halthane 88 with 21 phr Asilamine curing agent. Another three steel butt-tensile specimens were bonded to the same plate using Uniroyal Adiprene LW520 urethane cured with 14 phr of a methylenedianiline curing agent, XU205. All bond lines were set at 0.005" (127 μm). The urethane adhesive was cured in an oven at 90° C. The steel plate was then oriented with the steel butt-tensile specimens hanging downward. IR radiation was applied from the top of the plate with the IR lamp array at a distance of ~10" above the plate. The wave length of the IR radiation used in this experiment was near 1 μm. During this run the plate was heated to 250° C. for only 1 minute before all of the butt-tensile specimens released. The temperature of the steel specimens never exceeded 200° C. In all six cases, the urethane released from the plate and remained attached to the steel butt-tensile specimens. In no case did the urethane appear to be badly degraded.

Example 3

Three stainless steel butt-tensile specimens measuring 2.9 cm diameter×3.8 cm long and weighing 180 g were bonded to one face of a 6.30 mm-thick stainless steel plate. The adhesive used in this case was Halthane 88 with 21 phr Asilamine curing agent. Another three steel butt-tensile specimens were bonded to the same plate using Uniroyal Adiprene LW520 urethane cured with 14 phr of a methylenedianiline curing agent, XU205. All bond lines were set at 0.005" (127 μm). The urethane adhesive was cured in an oven at 90° C. The stainless steel plate was then oriented with the steel butt-tensile specimens hanging downward. IR radiation was applied from the top of the plate with the IR lamp array at a distance of ~10" above the plate. The wave length of the IR radiation used in this experiment was near 1 μm. Because stainless steel is more reflective and less absorptive than cast iron or the black, stamped steel plate, the stainless steel plate was heated to 300° C. All butt-tensile specimens released after only 5.5 minutes of heating. The temperature of the steel specimens never exceeded 250° C. In the case of LWW520/XU205, the urethane released from the plate and remained attached to the steel butt-tensile specimens. In the case of the Halthane 88/Asilamine urethane, most of this adhesive released from the plate and remained attached to the steel butt-tensile specimens. In no case did the urethane appear to be badly degraded.

Example 4

Three stainless steel butt-tensile specimens measuring 2.9 cm diameter×3.8 cm long and weighing 180 g were bonded to one face of a 16 mm-thick aluminum oxide ceramic plate. The adhesive used in this case was Halthane 88 with 21 phr Asilamine curing agent. All bond lines were set at 0.005" (125 μm). The urethane adhesive was cured in an oven at 90° C. The aluminum oxide plate was then oriented with the steel butt-tensile specimens hanging downward. IR radiation was applied from the top of the plate with the IR lamp array at a distance of ~10" above the plate. The wave length of the IR radiation used in this experiment was near 1 μm. The top of the aluminum oxide plate was heated to 325° C. All butt-tensile specimens released after only 4.5 minutes of heating. The temperature of the steel specimens never exceeded 285° C. The Halthane 88/Asilamine urethane released from the aluminum oxide plate and remained attached to the steel butt-tensile specimens. In no case did the urethane appear to be badly degraded.

Example 5

Two glass plates measuring 14 cm in diameter and 1 cm thick were bonded together using Halthane 88 and 21 phr Asilamine curing agent. The diameter of the adhesive spot measured 3 cm. The bond line was spaced at 0.002" (50.8 μm). IR radiation was applied from the top of the plate with the IR lamp array at a distance of ~10" above the plate. Power was applied slowly, while the behavior of adhesive was observed. In theory, the glass plates are transparent to IR radiation. Hence, the IR should pass through the glass and heat only the adhesive, which is highly absorbent of IR radiation. In practice, the IR radiation, as applied, was so intense, that it heated the glass plates as well as the adhesive. When the temperature at the top plate reached 275° C., the adhesive appeared to melt. The top glass plate slid over the bottom plate on a layer of liquid adhesive. When allowed to cool, the adhesive re-grabbed both glass plates. However, it was apparent that the parts could have been separated during the time interval when the adhesive was destabilized.

Example 6

Three stainless steel butt-tensile specimens measuring 2.9 cm diameter×3.8 cm long and weighing 180 g were bonded to one face of a 5.95 mm-thick cast iron plate, the same plate used for Example 1. The adhesive used in this case was Hardman Double Bubble epoxy. This is a common commercial two-part, fast-set epoxy that uses a thiol as the curing agent. Another three steel butt-tensile specimens were bonded to the same plate using Epon 826 epoxy cured with 43 phr of Jeffamine T403 curing agent. This system is a slow curing, high strength epoxy system. All bond lines were set at 0.005" (125 μm). The epoxy adhesive was cured in an oven at 90° C. The stainless steel plate was then oriented with the steel butt-tensile specimens hanging downward. IR radiation was applied from the top of the plate with the IR lamp array at a distance of ~10" above the plate. The wave length of the IR radiation used in this experiment was near 1 μm. The top of the cast iron plate was rapidly heated to 400° C. The higher temperature was chosen based upon experience gained from previous debonding tests. Heating was done through a quartz bell jar under 50 torr vacuum. The first butt-tensile specimen fell after just 1 min of heating. This specimen was bonded using the Hardman quick setting epoxy. The second specimen to fall was bonded with Epon 826. Neither epoxy system debonded faster than the other. The final specimen debonded after just 2.5 min of heating.

Example 7

In order to evaluate problems associated with IR debonding of two materials with vastly different coefficients of thermal expansion, a 9.5 mm-thick aluminum oxide cap was cast to fit over a 7.6 cm diameter aluminum rod. Series 1100 aluminum has a coefficient of thermal expansion (CTE) of ~24 μm/m-° C. and alumina has a CTE of ~7.5 μm/m-° C. A gap of approximately 0.25 mm existed between the aluminum oxide cap and the aluminum rod. The cap was bonded at the top using Halthane 88 and 21 phr Asilamine and cured at 90° C. A thermocouple was taped to the top of the aluminum oxide cap and to the side of the aluminum specimen under the alumina cap. The bonded samples were then heated in air with the IR lamps 10" from the top of the cap. After heating the top of the alumina cup at 300° C. for just 105 seconds, the aluminum rod dropped away from the cap. The aluminum had reached only 60° C. just below the cap. When the alumina cap had cooled, it was inspected. No damage was found on the cap.

Example 8

A 1 mm-thick sheet of stainless steel was bonded to each of the two opposing top and bottom faces of a 6 mm-thick flat tile of aluminum oxide insulation. Each sheet and each tile measured ~6" square. Each sheet of stainless steel was bonded to the aluminum oxide tile using Halthane 88 and 21 phr Asilamine. The bond gap was set at 0.005" or 127 μm. After curing this laminated structure, it was placed inside a quartz bell jar and the air evacuated to ~50 torr. A planar IR lamp array was placed ~10" above the laminated structure above the bell jar. Thermocouples were taped to the top of first steel sheet. The laminated structure was supported from the edges of the top steel sheet. 50 seconds after the IR lamps were lit, the temperature at the top steel sheet reached 300° C. and the alumina tile and bottom steel sheet released as a unit from the top steel sheet. After a short period of cooling, the top steel sheet was removed from the bell jar, and the remaining alumina tile that was still bonded to the bottom steel sheet were positioned in the bell jar for debonding. The bonded array was suspended from the edges of the alumina tile, with the alumina tile on top. A thermocouple was placed on the top of the alumina tile. The bell jar was once again evacuated to ~50 torr, and the IR lamp re-lighted. After 70 seconds the temperature at the top of the alumina tile reached 325° C., and the steel sheet released from the bottom of the array.

In order to repeat the experiment and generate more data, an array similar to the above array was glued, once again using the Halthane 88/Asilamine. The heating was again done in a quartz bell jar, which had been evacuated to ~50 torr. After just 25 seconds of IR heating in vacuum, the alumina tile insulation and the bottom steel sheet released from the top steel sheet. Temperature of the top steel sheet had reached 350° C. when release occurred. When cooled enough to allow handling, the bonded alumina tile/bottom steel sheet were repositioned in the bell jar. The bell jar was evacuated before IR heating began. After 2 minutes of heating, the temperature at the top of the alumina tile reached 450° C., and the bottom steel sheet released.

In order to get a feel for the variability in temperature and debonding time, the experiment was repeated a third time. The bottom alumina tile/steel sheet released this time after 60 sec of IR heating. Temperature at the top of the top steel sheet reached 400° C. when the bottom two bonded sheets released. When sufficiently cool to handle, the bonded alumina tile/bottom steel sheet were repositioned in the bell jar. The bell jar was evacuated before IR heating began. After 2 minutes of heating, the temperature at the top of the alumina tile reached 450° C., and the bottom steel sheet released.

In general, the time required for IR debonding of the 1 mm-thick stainless steel ranged from 25 to 60 seconds. IR debonding through the thicker aluminum oxide tile insulation ranged from 70 to 120 seconds. Both time ranges were very short when compared to the amount of time required for solvent debonding of similar arrays.

In summary, embodiments disclosed herein provide various methods for separating two articles that are joined together with an adhesive bond. The methods typically involve the application of short wavelength infrared radiation. In some embodiments an assembly of components to be debonded is placed inside an enclosure and the assembly is illuminated from an IR source that is outside the container. In some embodiments an assembly of components to be debonded is simultaneously irradiated by a multi-planar array of IR sources. Often the IR radiation is unidirectional. In some embodiments the IR radiation is narrow-band short wavelength infrared radiation.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments and with various modifications as are suited to the particular use contemplated. All such modifications and variations are within the scope of the appended claims when interpreted in accordance with the breadth to which they are fairly, legally, and equitably entitled.

What is claimed is:

1. An apparatus for separating a first component and a second component from one another comprising:
    an enclosure to contain the first component and the second component, wherein the enclosure is at least partially transparent to short wavelength infrared radiation;
    a first thermocouple to measure a first temperature of the first component;
    a second thermocouple to measure a second temperature of the second component; and
    an infrared radiation source external to the enclosure, wherein the infrared radiation source and the enclosure expose at least one of the first and the second component to infrared radiation and wherein the infrared radiation source monitors the first temperature and the second temperature and controls the first temperature until the first component and the second component are separated from one another.

2. The apparatus of claim 1 wherein the apparatus further comprises a vacuum pump to withdraw combustible gas mixtures from the enclosure.

3. The apparatus of claim 1 wherein the infrared radiation source controls the first temperature such that the second temperature is at least approximately 40° C. cooler than the first temperature.

* * * * *